United States Patent [19]

Kaneko et al.

[11] Patent Number: 4,802,026
[45] Date of Patent: Jan. 31, 1989

[54] VELOCITY ERROR CORRECTING CIRCUIT FOR TIME BASE ERROR CORRECTOR

[75] Inventors: Shinji Kaneko; Kenji Takanashi; Yoshiaki Wakisaka, all of Kanagawa, Japan

[73] Assignee: Sony Corporation, Tokyo, Japan

[21] Appl. No.: 96,451

[22] Filed: Aug. 14, 1986

[30] Foreign Application Priority Data

Aug. 19, 1985 [JP] Japan ................................. 60-181452
Nov. 30, 1985 [JP] Japan ................................. 60-270530

[51] Int. Cl.$^4$ ............................................. H04N 5/78
[52] U.S. Cl. .................................. 360/36.2; 358/320; 358/339
[58] Field of Search ........................... 360/36.1, 36.2; 358/320, 339, 337, 326, 327

[56] References Cited

U.S. PATENT DOCUMENTS 4,165,524  8/1979  Ninomiya .
4,393,413  7/1983  Kaneko .
4,558,377  12/1985  Collins et al. ..................... 360/36.2

FOREIGN PATENT DOCUMENTS 3109280  3/1981  Fed. Rep. of Germany .

*Primary Examiner*—Aristotelis M. Psitos
*Attorney, Agent, or Firm*—Lewis H. Eslinger; Donald S. Dowden

[57] ABSTRACT

A main memory stores a signal reproduced from a recording medium with a time base error, and a read clock generator and phase modulator generates a read clock signal of variable phase for reading out the signal from the main memory. A velocity compensating circuit generates first discrete signals representative of the velocity error of the reproduced signal at designated sample points of a current field and second discrete signals representative of a velocity error of the reproduced signal at sample points of a previous field respectively corresponding to the designated points and interleaves the first and second discrete signals to produce a combined signal having a sampling frequency greater than that of either the first or second discrete signals. The combined signal constitutes a nonlinear approximation of the time base error, and the read clock generator and phase modulator is responsive to the combined signal for controlling the readout of the reproduced signal from the main memory in such a manner as substantially to eliminate the time base error.

5 Claims, 5 Drawing Sheets

VELOCITY ERROR CORRECTING CIRCUIT FOR TIME BASE ERROR CORRECTOR

BACKGROUND OF THE INVENTION

1. Field of the Invention

This invention relates to velocity error compensation and, more particularly, to a novel and highly-effective velocity error compensating signal output device for use in a time base corrector for compensating time base errors in a signal reproduced from a video tape recorder or the like.

2. Description of the Prior Art

In a signal reproduced from a video tape recorder or the like having a rotating head, there is included an unwanted time base fluctuation, or so-called jitter, due to nonuniformity in the rotating speed of the head. This is one of the causes of degradation of the video signal. In the color video signal, stability of the phase information is especially important, and it is therefore customary to use a time base corrector for compensating the time base error.

However, in the prior art, as described in more detail below, the detecting or sampling frequency of the velocity error is at the horizontal or line frequency, so that it is impossible to detect a component of the velocity error signal having a frequency higher than one-half of the horizontal frequency. Consequently, the response characteristic of prior art time base correctors to the time base variation is about 3 kHz or less.

OBJECTS AND SUMMARY OF THE INVENTION

An object of the present invention is to provide a velocity error compensating signal output device that improves the response characteristic of a time base corrector to high frequency jitter.

Another object of the invention is to provide a velocity error compensating signal output device that improves the response characteristic of a time base correcting operation to high frequency jitter by making the velocity error detection period substantially shorter than 1 H and applying a higher order curvature approximation to the velocity error.

A further object of the invention is to provide a velocity error correcting device that readily achieves compensation for errors which are caused by impacts of the head on the tape.

Yet another object of the invention is the provision of a velocity error correcting device capable of precise time base correction.

In accordance with one aspect of the present invention, a time base corrector for correcting a time base error in a signal reproduced from a recording medium in a succession of fields is provided, the time base corrector comprising: a main memory for storing a signal reproduced from a recording medium with a time base error; read clock generator and phase modulator means for generating a read clock signal of variable phase for reading out the signal from the main memory; and a velocity error compensating circuit for generating first discrete signals representative of the velocity error of the reproduced signal at designated sample points of a current field and second discrete signals representative of the velocity error of the reproduced signal at sample points of a previous field respectively corresponding to the designated points and for interleaving the first and second discrete signals to produce a combined signal having a sampling frequency greater than that of either of the first and second discrete signals; the combined signal constituting a nonlinear approximation of the time base error and the read clock generator and phase modulator means being responsive to the combined signal for controlling the readout of the reproduced signal from the main memory in such a manner as substantially to eliminate the time base error.

In accordance with another aspect of the present invention, apparatus for producing a velocity error compensating signal used for a time base corrector for correcting a time base error included in a reproduced video signal organized in a succession of frames is provided, the apparatus comprising: means for generating velocity error signals for a present field and a preceding field and means for interleaving the velocity error signals to produce a combined signal constituting a nonlinear approximation of the time base error.

BRIEF DESCRIPTION OF THE DRAWINGS

A better understanding of the objects, features and advantages of the invention can be gained from a consideration of the following detailed description of the preferred embodiments thereof, in conjunction with the appended figures of the drawing, wherein a given reference character always designates the same element or part, and wherein.

DESCRIPTION OF THE PREFERRED EMBODIMENTS

Figure 1:
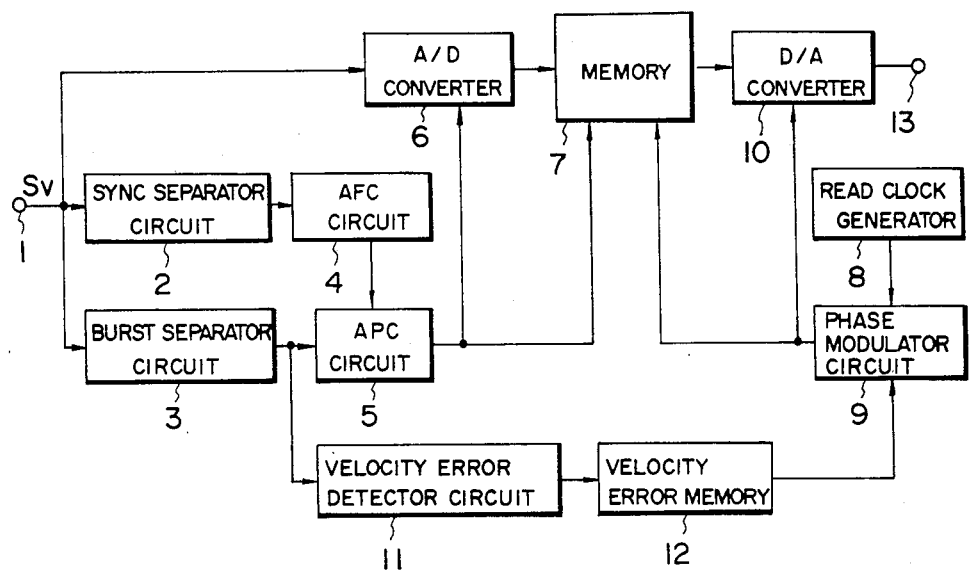
FIG. 1 is a schematic block diagram of a prior art time base corrector.

FIG. 1 is a block circuit diagram showing an example of a basic structure of a time base corrector hitherto known (refer, for example, to Japanese Patent Laid-open No. 52-9312/1977).

In FIG. 1, a terminal 1 is supplied with a reproduced color video signal $S_v$ from the VTR (video tape recorder). The video signal $S_v$ received at the terminal 1 is supplied to a sync separator circuit 2 and a burst separator circuit 3. The sync signal from the sync separator circuit 2 is delivered to an AFC (automatic frequency control) circuit 4. The AFC circuit 4 generates a clock signal following the frequency of the video signal $S_v$. The clock signal is supplied to an APC (automatic phase control) circuit 5. The APC circuit 5 is also supplied with a burst signal from the burst separator circuit 3. The APC circuit 5 generates a signal of, for example $4 f_{sc}$ ($f_{sc}$ is the color subcarrier frequency of the burst signal), following the frequency of the video signal $S_v$ and phase-locked to the burst signal, and this signal is used as a write clock. The write clock is supplied to an A/D converter 6 and a memory 7.

The video signal $S_v$ supplied to the terminal 1 is converted by the A/D converter 6 into a digital signal and supplied to the memory 7. The signal is written and stored in the memory 7 with the above described write clock. The stored contents are read out under the control of a read clock signal that has the same frequency as that of the write clock but does not exhibit the time base fluctuation.

A read clock generator 8 generates a read clock signal of a fixed frequency ($4 f_{sc}$) which is supplied through a phase modulator circuit 9 to the memory 7 and a D/A converter 10.

The burst signal from the burst separator circuit 3 is supplied to a velocity error detector circuit 11. This velocity error detector circuit 11 detects velocity errors and the velocity error signal is supplied to a velocity error memory 12 to be stored therein. From this velocity error memory 12, the velocity error signal corresponding to the video signal to be read out from the memory 7 is read out in succession and the signal is supplied to the phase modulator circuit 9, in which phase modulation of the read clock signal to be supplied to the memory 7 and the D/A converter 10 as described above is performed. Thus, a good video signal compensated for its time base errors is obtained at an output terminal 13.

Figure 2:
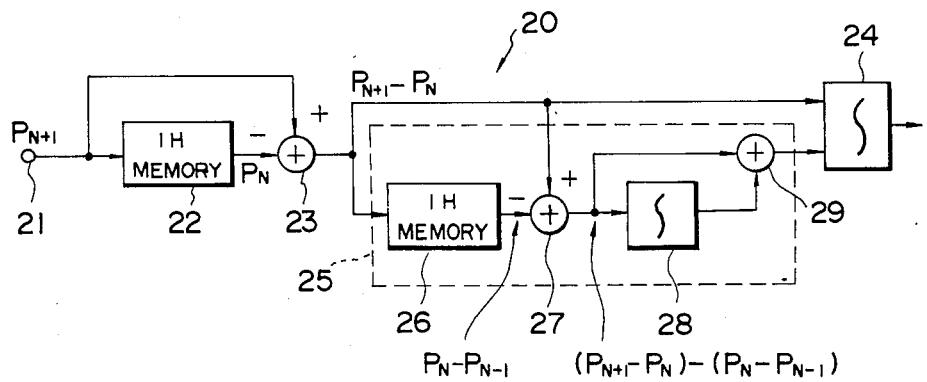
FIG. 2 is a schematic block diagram of a prior art velocity error compensating signal output circuit.

In the case of a technique as described in Japanese Patent Laid-open No. 56-73992/1981, a velocity error compensating signal output circuit 20 as shown in FIG. 2 is used instead of the velocity error detector circuit 11 and the velocity error memory 12, whereby a second order approximation of phase errors (velocity errors) is performed based upon phase information obtained from color burst components in three or more consecutive horizontal scanning lines. The phase modulator circuit 9 is controlled by the second order approximated velocity errors.

In the velocity error compensating signal output circuit 20 in FIG. 2, a terminal 21 is supplied with a burst signal, specifically burst phase information $P_{N+1}$, from a source as the above described burst separator circuit 3. By means of a 1 H memory (or delay unit) 22 and an adder (or subtractor) 23, $P_{N+1} - P_N$, the phase error (velocity error) arising in the time interval 1 H, is detected. The detected output $P_{N+1} - P_N$ is sent to an integrator 24 as a first order component of the velocity error and also sent to a circuit 25 which provides a second order component. The circuit 25 consists of a 1H memory (delay unit) 26, an adder (subtractor) 27, an integrator 28, and an adder 29. The adder (subtractor) 27 produces an output $$(P_{N+1} - P_N) - (P_N - P_{N-1}),$$

which is an approximation of the second differential of the error. This signal is subjected to integration by the integrator 28 and addition by the adder 29 and thereafter sent to the integrator 24, wherein an approximation of second order component of the error is generated. The output from the integrator 24 is used to control, for example, the phase modulator circuit 9 in FIG. 1.

However, in the velocity error compensating signal output devices for use in a time base corrector as shown in FIGS. 1 and 2, the detecting frequency of the velocity error is a horizontal frequency $f_H$ (for example, 15.734 kHz). That is, the detection of velocity errors is made only for each 1H (one horizontal line period). Therefore, in the case of FIGS. 1 and 2, it is impossible from the sampling theorem to detect a component of the velocity error having a frequency higher than ½ of the horizontal frequency $f_H$; in other words, since the error detection is made at intervals of 1H, finer variations within the range of 1H cannot be followed.

Consequently, the response characteristic of these time base correctors to the time base variation is about 3 kHz or less. A good response to high frequency jitter is not provided and residual errors are present.

The present invention takes advantage of the following findings: In a VTR having a rotating magnetic head, there are produced impact errors due to impacts of the head on the tape, but these impact errors occur at the same distance from the vertical synchronization position in each field, and the frequency of the impact errors is virtually constant. Because of the interlacing of the fields, the horizontal synchronization position is shifted by 0.5 horizontal line between a first field and a second field.

An embodiment of the present invention is described below with reference to FIG. 3. The parts of FIG. 3 corresponding to those in FIG. 1 are denoted by the same reference numerals and detailed explanation thereof need not be repeated.

Figure 3:
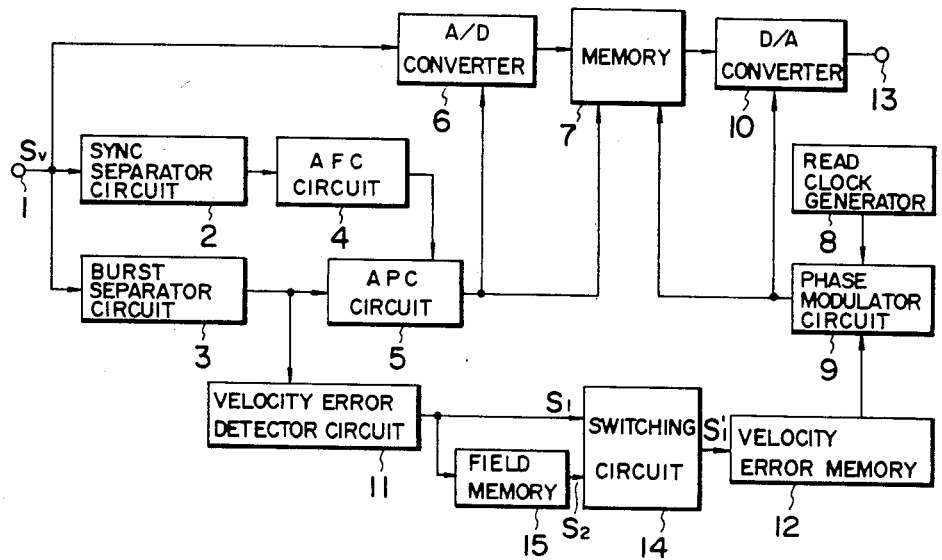
FIG. 3 is a schematic block diagram of a preferred embodiment of apparatus constructed in accordance with the present invention.

In FIG. 3, a velocity error signal $S_1$ obtained from the velocity error detector circuit 11 is supplied to a switching circuit 14 and to a field memory 15 constituting a field delay line. A velocity error signal $S_2$ detected one field period ago from the field memory 15 is supplied to the switching circuit 14.

The velocity error signals $S_1$ and $S_2$ are detected for every horizontal line period (1H), and since the horizontal synchronization position is shifted by 0.5 horizontal line between the first field and the second field as described above, there is a shift of 0.5 horizontal line between the velocity errors signals $S_1$ and $S_2$.

The switching circuit 14 performs a switching operation such that the velocity error signals $S_1$ and $S_2$ are taken out alternately. From the switching circuit 14, a signal $S_1'$, which is produced by interleaving the velocity error signal $S_2$ and the velocity error signal $S_1$, is obtained. The signal $S_1'$, serving as a velocity error signal, is supplied to the velocity error memory 12 and stored therein.

In other respects, the structure of FIG. 3 is the same as that in the example of FIG. 1.

Figure 4:
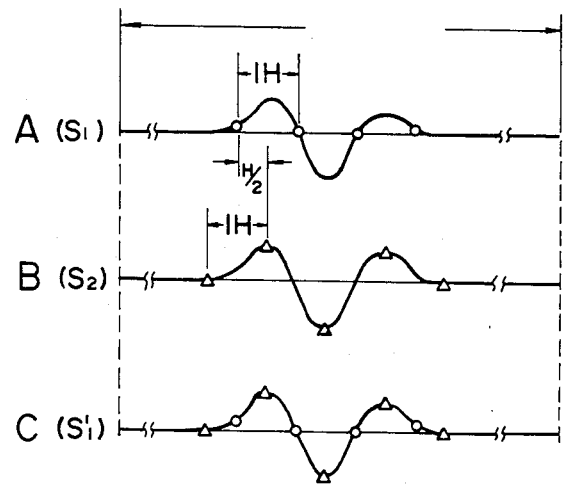
FIG. 4A-C is a diagram for explaining FIG. 3.

In the present example, from the velocity error detector circuit 11, the velocity error signal $S_1$ at impact error positions of, for example the present field, is obtained as indicated by the circles in FIG. 4A at intervals of one horizontal line period (1H). From the field memory 15, the velocity error signal $S_2$ at impact positions of, for example the corresponding time one field period ago, is obtained as indicated by the triangles in FIG. 4B at intervals of one horizontal line period. From the switching circuit 14 is obtained the velocity error signal $S_1'$ composed of the velocity error signal $S_1$ and the velocity error signal $S_2$, the two being interleaved as indicated by the alternating triangles and circles in FIG. 4C at intervals of ½ horizontal line period. The signal $S_1'$ is supplied to the velocity error memory 12.

Thus, according to the present example, the detecting frequency of the velocity error is substantially doubled (compare FIG. 4C with FIGS. 4A and 4B), and so it becomes possible to improve the response characteristic of the TBC (time base corrector) to high frequency jitter. The apparatus of the invention is especially effective for compensation for the impact errors produced by the impacts of the head.

Although the embodiment of the invention described above is adapted to compensate velocity errors wherever arising, it can be arranged that only the impact error portion is compensated. It can be arranged, for example, that the velocity error signal $S_1'$ is supplied from the switching circuit 14 to the velocity error memory 12 only for the impact error portion.

Further, by averaging the velocity error signals $S_1'$ by means of a memory, the S/N (signal-to-noise ratio) is improved.

Figure 5:
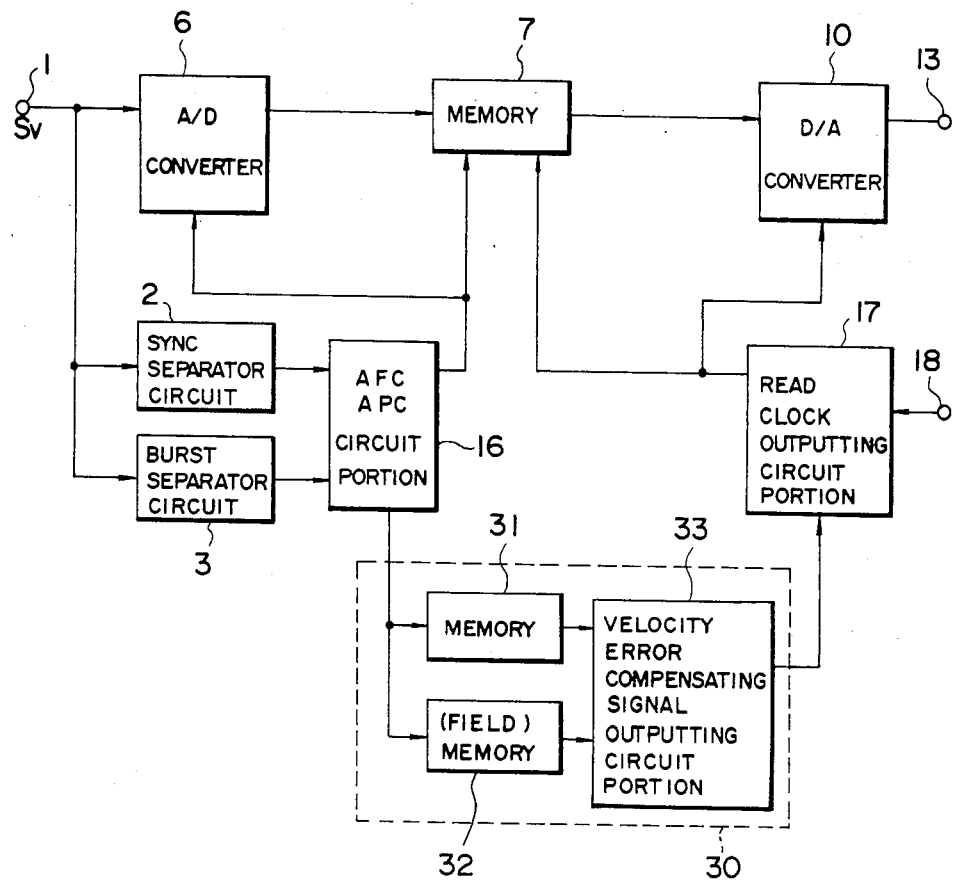
FIG. 5 is a schematic block diagram of another embodiment of apparatus instructed in accordance with the present invention.

FIG. 5 shows another embodiment of the present invention. In FIG. 5, parts corresponding to those in FIG. 1 are denoted by the same reference characters. A reproduced color video signal $S_v$ received from the video tape recorder at the input terminal 1 is supplied to each of the sync separator circuit 2, the burst separator circuit 3, and the A/D converter 6. The sync signal from the sync separator circuit 2 and the burst signal from the burst separator circuit 3 both are supplied to an AFC-APC circuit 16. From the AFC-APC circuit 16 is obtained a signal following the frequency of the above mentioned input video signal $S_v$ and phase-locked to the burst signal of, for example 4 $f_{sc}$ ($f_{sc}$ is the color subcarrier frequency). The signal of frequency 4 $f_{sc}$ is supplied as a write clock to the main memory 7 and the A/D converter 6 on the input side.

A read clock output circuit 17 generates a signal of a fixed frequency (e.g., 4 $f_{sc}$) responding, for example, to a reference video signal (a sync signal thereof or the like) from an input terminal 18 and generates a read clock output by phase modulating the above mentioned signal according to a later discussed velocity error compensating signal. The read clock is supplied to both the memory 7 and the D/A converter 10 on the output side.

Therefore, the input video signal $S_v$ supplied to the input terminal 1, when converted into a digital signal by the A/D converter 6 and written in the memory 7, undergoes both automatic frequency control and automatic phase control for each synchronizing period (1H period). When the contents of the memory 7 are read out and subjected to the D/A conversion by the D/A converter 13, they undergo compensation for the time base fluctuation, the so-called velocity error, during a 1H period. The video signal converted into an analog signal in the D/A converter 10 and compensated for the time base error is taken out from the output terminal 13.

The memory 7 serves as variable delay means capable of delaying the video signal by a maximum of several lines (several H). By controlling the delay time between the writing in and reading out of the memory 7, the above mentioned time base fluctuation of the input video signal can be absorbed.

Figure 6:
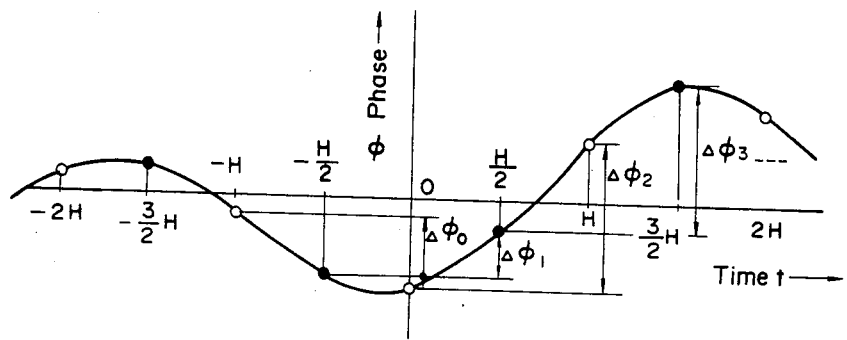
FIG. 6 is a graph showing phase variations in a color subcarrier of an input video signal.
Figure 7:
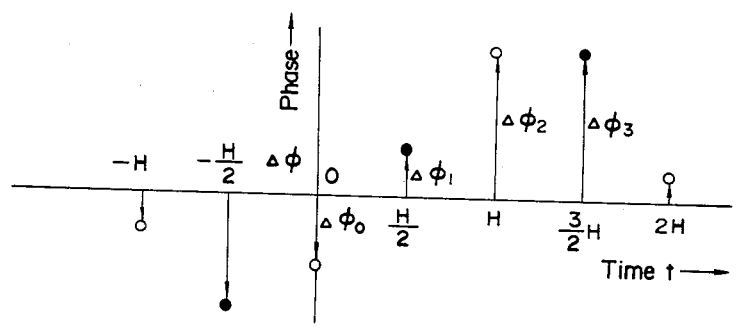
FIG. 7 is a graph showing phase differences in the color subcarrier of FIG. 6 as detected velocity errors.

The velocity error compensating signal output circuit 30, which is an important part of the embodiment of FIG. 5, is supplied with a velocity error signal from the AFC-APC circuit 16. When the phase $\phi$ of the color burst signal (color subcarrier signal) in the above mentioned input video signal $S_v$ varies with time as shown in FIG. 6, the velocity error signal corresponds to the phase differences $\Delta\phi$ shown in FIG. 7, which are obtained by subtracting the phase values at times 1H period ago from corresponding phase values in the present 1H period. In FIGS. 6 and 7, the open circles indicate the phase values and phase differences in the present field and the filled-in or black circles indicate the phase values and the phase differences in the preceding field (1 vertical scanning period ago).

The phase of the video signal as written in the memory 7 is regulated to conform to the reference phase for each 1H period by APC action of the AFC-APC circuit 16 in FIG. 5. Therefore, the phase error at the beginning of each 1H period is zero and the phase error corresponding to the phase difference $\Delta\phi$ as shown in FIG. 7 is present at the end of the period H under consideration. What is now to be done is to obtain the variation curve of the phase errors during the period H by a higher curvature approximation (for example, a second order curvature approximation) by means of the velocity error compensating signal output circuit 30. By the use of the velocity error in the present field and the velocity error in the preceding field, velocity error detection for each 0.5H period can be achieved in substance by taking into consideration that the horizontal synchronization positions of two consecutive fields are shifted by 0.5H from each other and the correlation of the velocity error signal between two fields is high. Thus, a higher order curvature approximation can be performed based upon the velocity errors for each 0.5H period.

More specifically, the velocity error signal from the AFC-APC circuit 16 is sent both to a memory 32 for providing a delay of several lines (several Hs) and to a memory 31 for providing a delay of one field (1V) or so. The memory 32 provides the velocity error signal with a delay which is 1H or so shorter than the delay of the memory 7 for the video signal. This is done because the above described phase difference information for the preceding line is required in order to make the time base correction of the signal read out from the memory 7 for the present time. The velocity error signals of the present field and of the preceding field supplied as outputs by these memories 32 and 31 are supplied to a higher order (for example, second order) curvature approximation circuit 33. The circuit 33 performs a higher order curvature approximation and generates the velocity error compensating signal as an output.

The case where the phase fluctuation between the t=0 and time t=H in FIG. 6 is calculated by a second order curvature approximation is described below.

Figure 8:
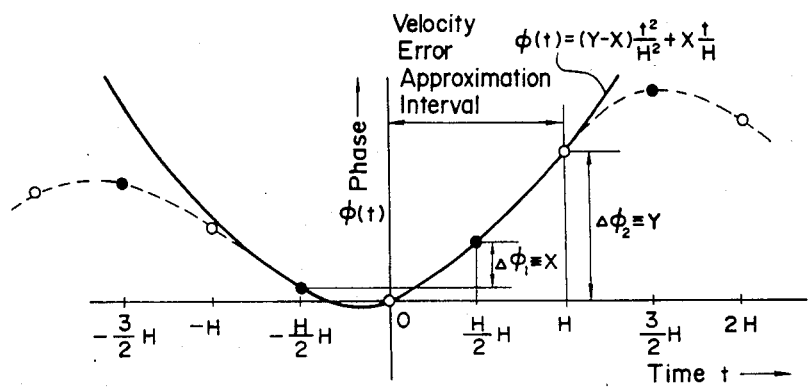
FIG. 8 is a graph for explaining a second order curve approximating the velocity errors of FIG. 7.

Since the phase is regulated to conform with the reference phase by the above described APC action at time t=0, the phase fluctuation curve to be corrected will indicate that the phase $\phi$ is equal to zero at time t=0 (FIG. 8). Based upon the phase difference $\Delta\phi_1$ ($\equiv$X) between t=−H/2 and t=H/2 corresponding to the velocity error in the preceding field and the phase difference $\Delta\phi_2$ ($\equiv$Y) between t=0 and t=H corresponding to the velocity error in the present field, the curve of second order passing these points (t=−H/2, 0, H/2, and H)

$$\phi(t) = At^2 = Bt + C \tag{1}$$

will be found. That is, A, B, and C will be determined employing X and Y.

From the condition that the phase becomes zero at the time t=0 by the above described APC action, $$\phi(0) = C = 0. \tag{2}$$

That is, we can take equation (1) as $\phi(t) = At^2 + Bt$. Since the above $X(=\Delta\phi_1)$ and $Y(=\Delta\phi_2)$ are expressed as $$\phi(H/2) - \phi(-H/2) = X \tag{3}$$

$$\phi(H) - \phi(0) = Y, \tag{4}$$

we obtain $$A = (1/H^2)(Y - X) \tag{5}$$

$$B = X/H, \tag{6}$$

Therefore, the second order curvature approximation equation is given as $$\phi(t) = (Y - X)(t^2/H^2) + X(t/H). \tag{7}$$

Figure 9:
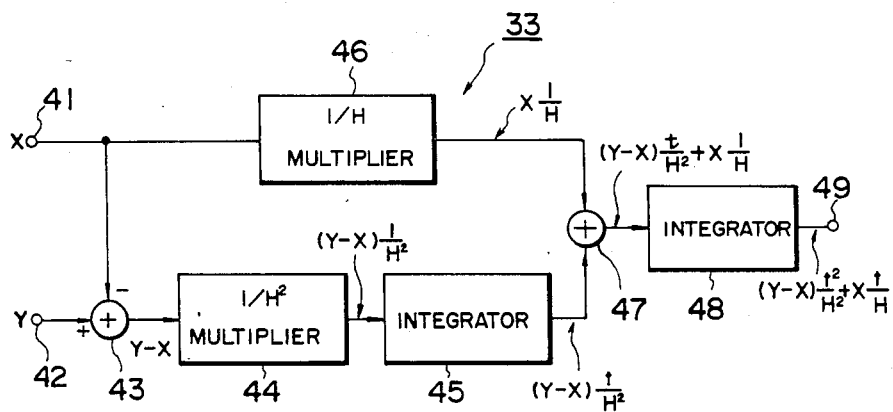
FIG. 9 is a schematic block diagram of a concrete example of the higher order curvature approximation circuit of FIG. 5.

The multiplication by time t in equation (7) corresponds to integration with respect to time on the circuit. If equation (7) is transformed to $$\phi(t) = \{(Y - X)(1/H^2)t + X(1/H)\}t \tag{8}$$

this operation can be readily achieved by the circuit arrangement of FIG. 9.

FIG. 9 shows a second order curvature approximation circuit as a concrete example of the higher order curvature approximation circuit 33 in FIG. 5. In FIG. 9, an input terminal 41 is supplied by the above described memory 31 with the velocity error in the preceding field (corresponding to the above mentioned X) and an input terminal 42 is supplied by the above mentioned memory 32 with the velocity error in the present field (corresponding to the above mentioned Y). These signals X and Y are subjected to subtraction in an adder (subtractor) 43 and thereby Y−X is obtained. The signal corresponding to Y−X from the adder 43 is multiplied by $1/H^2$ by a coefficient multiplier 44 and time-integrated by an integrator 45. A signal $(Y-X)(1/H^2)t$ is thus obtained from the integrator 45. The signal X from the input terminal 41 is multiplied by 1/H by a coefficient multiplier 46 and supplied to an adder 47 so as to be added to the output from the integrator 45. Therefore, the output from the adder 47 becomes a signal corresponding to $(Y-X)(1/H^2)t + X(1/H)$. This signal is supplied to an integrator 48 in which it is time-integrated. A velocity error compensating signal corresponding to equation (8) and approximated by a second order curvature approximation is thus produced and taken out from an output terminal 49. The velocity error compensating signal from the output terminal 49 is delivered to the read clock output circuit 17 in FIG. 5. In this circuit 17, the phase of the signal of fixed frequency (for example, 4 $f_{sc}$) is controlled by the above described velocity error compensating signal as approximated by the second order curvature approximation. The previously described read clock is thus obtained.

Of course circuit arrangements other than that of FIG. 9 can achieve the operation of the above equation (7).

Thus the velocity error compensating signal from the velocity error compensating signal output circuit 30 corresponds to the varying curve of the phase error in the interval between the time t=0 and time t=H. This is accomplished by, for example, a second order curvature approximation based on the phase difference $\Delta\phi$, i.e. velocity errors, obtained from phase information that is substantially equivalent to what is detected at the sampling period of 0.5H (refer to FIGS. 6 and 8). Therefore, in accordance with the invention it is possible to detect frequency components up to substantially twice as high as those of the velocity error signals obtained by phase information at intervals of 1H in the prior art. In addition, since this is accomplished through the second order curvature approximation, it provides, as compared with a first order (linear) approximation, a more precise velocity error compensating curvature. In particular, it includes nonlinear components in the actual phase varying curve, and so, in the time base correction, it substantially improves the response characteristic to high frequency jitter in the input video signal (to a frequency substantially twice as high as that in the prior art). The invention therefore enables high quality time base error correction including nonlinear fluctuation components.

The description set forth above gives as an example correction using second order curvature approximation but a third order or higher order curvature approximation may be employed.

For example, when $$\phi(t) = At^3 + Bt \tag{9}$$

is established as a curve of third order, $\phi(t)$ is expressed as $$\phi(t) = \frac{4}{3H^3}(Y - X)t^3 + \frac{1}{H}\left(\frac{4}{3}X - \frac{1}{3}Y\right)t. \tag{10}$$

Of course, the overall structure of the time base corrector is not limited to the example of FIG. 5, but the velocity error compensating signal output device of the present invention can be applied to other time base correctors of various structures.

Thus there is provided in accordance with the invention a novel and highly-effective velocity error compensating signal output device for use in a time base corrector for compensating time base errors in a signal reproduced from a video tape recorder or the like. Many modifications of the preferred embodiments of the invention described above will readily occur to those skilled in the art. Accordingly, the invention is not limited except by the appended claims.

What is claimed is:

1. A time base corrector for correcting a time base error in a signal reproduced from a recording medium in a succession of interlaced fields each formed of a plurality of horizontal lines, each of said lines having a horizontal synchronization position which is shifted by 0.5 horizontal line between successive ones of said fields; said time base corrector comprising:

a main memory for storing a signal reproduced from a recording medium with a time base error;

read clock generator and phase modulator means for generating a read clock signal of variable phase for reading out said signal from said main memory; and a velocity error compensating circuit for generating first discrete signals representative of the velocity error of said reproduced signal at designated sample points of a current field and second discrete signals representative of the velocity error of said reproduced signal at sample points of a previous field respectively correspondign to said designated points and for interleaving said first and second discrete signals to produce a combined signal having a sampling frequency twice that of either of said first and second discrete signals;

wherein said combined signal constitutes a nonlinear approximation of said time base error and said read clock generator and phase modulator means is responsive to said combined signal for controlling the readout of said reproduced signal from said main memory in such a manner as substantially to eliminate said time base error; and wherein said velocity error compensating circuit comprises a velocity error detector circuit for generating said first discrete signals, a field memory for delaying an output of said velocity error detector circuit by one field period to generate said second discrete signals, and switching means jointly responsive to said velocity error detector circuit and said field memory for generating said combined signal.

2. A time base corrector according to claim 1, wherein said read clock generator and phase modulator means comprises a self-timed read clock generator.

3. A time base corrector according to claim 1, wherein said read clock generator and phase modulator means is responsive to an external synchronizing signal.

4. A time base corrector according to claim 1; wherein said velocity error compensating circuit comprises a pair of memories for respectively generating said first discrete signals and said second discrete signals and a velocity error compensating signal output circuit jointly responsive to said pair of memories for generating said combined signal.

5. A time base corrector for correcting a time base error in a signal reproduced from a recording medium in a succession of fields, said time base corrector comprising:

a main memory for storing a signal reproduced from a recording medium with a time base error;

read clock generator and phase modulator means for generating a read clock signal of variable phases for reading out said signal from said main memory; and a velocity error compensating circuit for generating first discrete signals representative of the velocity error of said reproduced signal at designated sample points of a current field and second discrete signals representative of the velocity error of said reproduced signal at sample points of the previous field respectively corresponding to said designated points and for interleaving said first and second discrete signals to produce a combined signal having a sampling frequency greater than that of either of said first and second discrete signals;

said combined signal constituting a nonlinear approximation of said time base error and said read clock generator and phase modulator means being responsive to said combined signal for controlling the readout of said reproduced signal from said main memory in such a manner as substantially to eliminate said time base error;

wherein said velocity error compensating circuit comprises a pair of memories for respectively generating said first discrete signals and said second discrete signals and a velocity error compensating signal output circuit jointly responsive to said pair of memories for generating said combined signal; and wherein each field is divided into a plurality of periods H and said velocity error compensating signal output circuit comprises a 1/H multiplier responsive to said second discrete signals, a $1/H^2$ multiplier and integrator jointly responsive to said first discrete signals and said second discrete signals, and a second integrator jointly responsive to said 1/H multiplier and said $1/H^2$ multiplier and integrator to produce said combined signal.

* * * * *

UNITED STATES PATENT AND TRADEMARK OFFICE
CERTIFICATE OF CORRECTION

PATENT NO. : 4,802,026
DATED : January 31, 1989
INVENTOR(S) : SHINJI KANEKO ET AL.

It is certified that error appears in the above-identified patent and that said Letters Patent is hereby corrected as shown below:

On the Title Page, Item [21] Appl. No.: "96,451" should be --896,451--.

Column 2, line 2, change ":" to --;--.

IN CLAIMS.

Column 9, line 1, change "correspondign" to --corresponding--;
line 22, change "," to --;--;
line 25, change "," to --;--.

Signed and Sealed this

Twenty-fifth Day of July, 1989

Attest:

DONALD J. QUIGG

Attesting Officer

Commissioner of Patents and Trademarks